June 2, 1936. A. F. MACCONOCHIE 2,042,854

GRASS AND WEED MOWER

Filed Oct. 2, 1934

WITNESSES
Laurence O. Mankin

INVENTOR
A. F. Macconochie,
BY
Munn, Anderson & Liddy
ATTORNEYS

Patented June 2, 1936

2,042,854

UNITED STATES PATENT OFFICE 2,042,854

GRASS AND WEED MOWER

Arthur F. Macconochie, University, Va.

Application October 2, 1934, Serial No. 746,585

9 Claims. (Cl. 56—294)

My invention relates to improvements in lawn mowers especially designed to cut grass and also weeds which rise above the axis of the cylinder, and which are ordinarily left uncut, and it consists in the combinations, constructions and arrangements herein described and claimed.

An object of my invention is to provide a device which will enable an ordinary standard lawn mower to cut weeds by substituting for the ordinary spiral cutter blades and the frame and shaft upon which they are mounted, a similar shaft and frame and similar cutter blades which are provided with a series of auxiliary cutters or combs mounted between the spiral cutter blades.

A further object is to provide a device of the type described which is simple in construction, and which adds very little weight, but which is very efficient for the purpose.

A further object is to provide auxiliary means for cutting weeds which increases the strength and rigidity of the main cutting blades.

A further object is to provide a construction in which weeds, long grass, etc. may be readily thrown out when cut, thus obviating the danger of clogging by the additional mass of material cut.

A further object is to provide combs between the adjacent cutter blades which can be readily adjusted to conform to the material removed from the cutter blades in sharpening.

Other objects and advantages will appear in the following specification and the novel features of the invention will be particularly pointed out in the appended claims.

My invention is illustrated in the accompanying drawing forming part of this application, in which.

Figure 1:
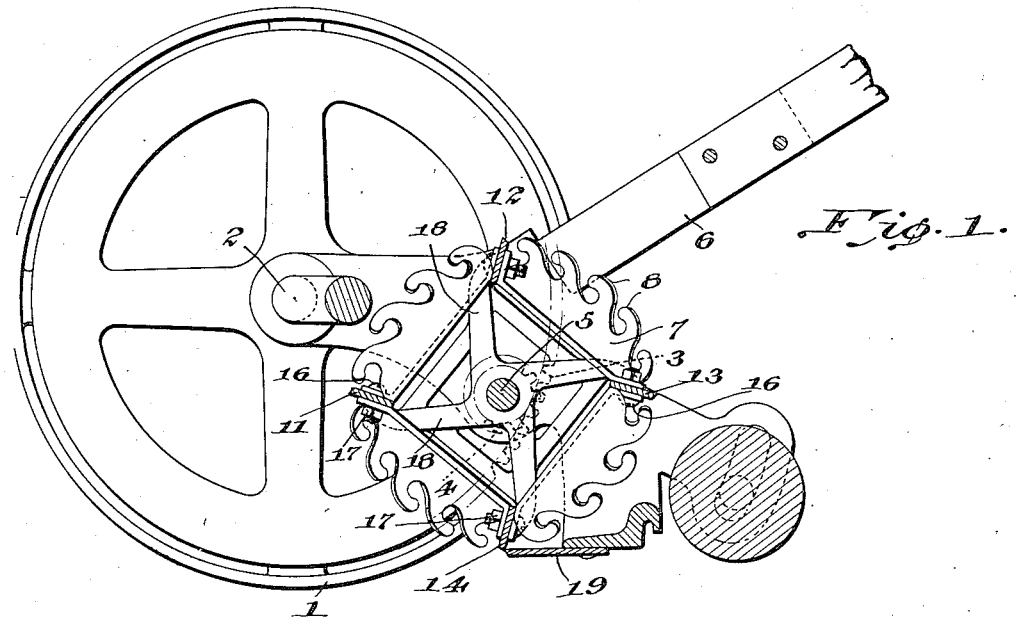
Figure 1 is a sectional view of a lawn mower, the spiral cutting blades and the auxiliary combs being shown in elevation.

As stated, the invention may be applied to any ordinary form of lawn mower in which revolving spiral blades come in close proximity to a stationary cutter blade. It is immaterial as far as this invention is concerned, what form of mechanism is used to transmit rotary movement to the shaft upon which the spiral blades are mounted to revolve. In the present instance I have shown only enough of the driving mechanism to indicate generally a type of lawn mower to which my invention is applicable.

In the drawing, 1 indicates a drive wheel which is mounted to revolve on the end of a shaft 2. This drive wheel may have an integral internal gear 3 to engage a gear 4 on a shaft 5, so as to rotate the latter. Any suitable form of ratchet mechanism, not shown, may be used, so that the shaft 5 will rotate when the device is pushed in a forward direction by the handle 6. The construction thus far described is ordinary.

Figure 3:
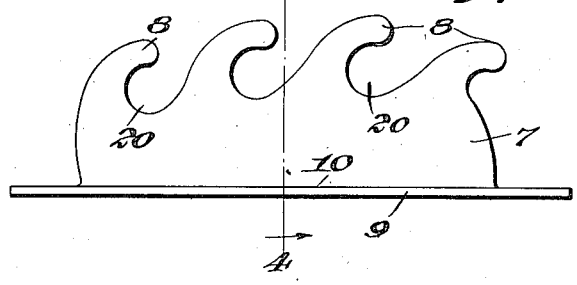
Figure 3 is a face view of one of the combs.
Figure 4:
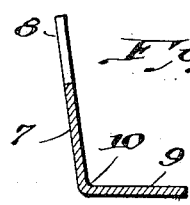
Figure 4 is a section along the line 4—4 in Figure 3.

The new features consist in the provision of a series of combs secured to the spiral blades. In Fig. 3 I have shown one of these combs. The comb is preferably stamped from a single piece of metal. It consists of a body portion 7, having curved hook-like teeth 8 which are spaced from one another. The body portion is provided with a flange 9 which is made by bending the metal sheet at the line 10. As will be seen from Fig. 3, the flange 9 is longer than the body portion of the comb and this is for the purpose of attaching the comb to the spiral blades.

Figure 2:
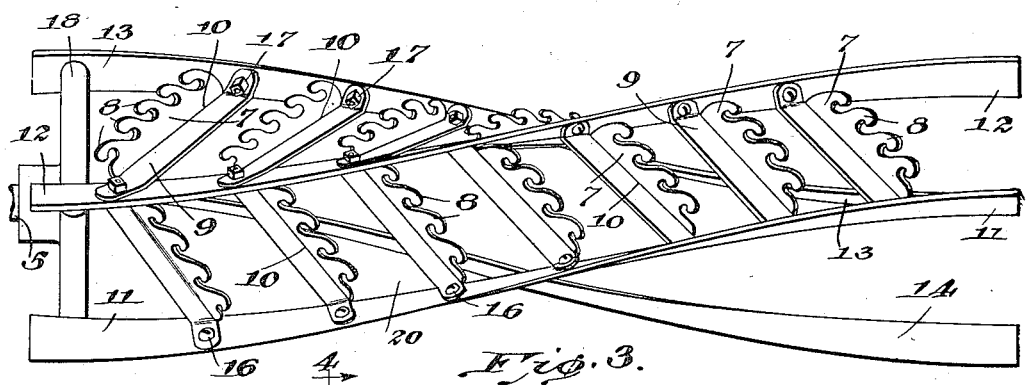
Figure 2 is a front elevation of the four cutter blades showing the combs disposed between three adjacent blades, the remaining parts of the frame and the shaft being omitted for the sake of clearness.

In Fig. 2 I have shown four blades of a cutter. These blades are indicated at 11, 12, 13 and 14. The illustration in Fig. 2 shows combs attached to the blade 12 and to the blades 11 and 13 on either side thereof. It is understood, however, that combs extend between all adjacent blades. It will be observed that the combs extending between the blades 11 and 12 are inclined at an angle to a plane normal to the axis of the central shaft 5, a small portion of which is shown at the left of Fig. 2. The combs are not only disposed angularly with respect to the plane normal to the axis, but are also inclined with respect to a longitudinal plane normal to the flange 9, or in other words, the angle between the body portion and the flange is greater than a right angle.

The ends of the flanges are bent to conform to the sides of the cutter blades and they are preferably held by screw bolts 16 and nuts 17. The combs between the blades 12 and 13 are inclined in the opposite direction. Those between the blades 13 and 14 are inclined in the same direction as those between the blades 11 and 12, while those combs between the blades 14 and 11 are inclined in the same direction as the combs between the blades 12 and 13. It will thus be seen that with a lawn mower having four spiral blades two of the sets of combs are inclined in one direction and two in the other. In Fig. 2 I have shown one of the end frames 18 for supporting the blades, and in Fig. 1 the other frame 18 is shown.

From the foregoing description of the various parts of the device the operation thereof may be readily understood. As the mower is pushed along to the left in Fig. 1 and the cutter blades are revolved with the shaft 5, they will act as ordinary and will engage the grass and cut it off against the stationary cutter 19. If there should be tall upstanding grass or weeds projecting above the axis of the shaft 5, this grass or weeds will be engaged by the combs and dragged down into position to be cut by the succeeding cutter bars. Usually when weeds are encountered the stalk is either standing straight up or is bent to the right or left. Those weeds which are bent in one direction are caught by combs inclined in one direction while the weeds that are bent in the other direction are caught by combs inclined oppositely and are held or drawn inwardly so as to permit the succeeding blades to cut the weed off.

The purpose of the enlarged space 20 between the combs—see Fig. 3—is to permit ready clearance when the weeds have been cut. The centrifugal force tends to throw these weeds away from the mower and this is facilitated by these recesses 20. Of course if a weed or a stalk of coarse grass is standing upright then the combs will engage it and it will be cammed along the surface of one tooth into the recess 20 of the adjacent tooth and will be drawn into position to be cut by the succeeding cutter blade. Furthermore the engagement of the spiral edge of the cutter blade will tend to bend the stalk so as to make it more easily accessible to the angularly disposed combs.

The construction defined above lends itself to an adjustment of the combs when the metal is removed from the blades in sharpening them. As will be seen from Fig. 1 the combs are substantially in circular alinement with the outer edges of the cutter blades. If the latter are sharpened the stationary blade 19 will have to be adjusted forwardly to compensate, and the combs have to be adjusted accordingly. This is done by merely bending them at a greater angle than that necessary when the combs are first secured in position. This will tend to draw in the outer edges of the comb so that these outer edges will conform with the outer edges of the rotary cutters. Not only is the clearance of the group of teeth in every comb adjusted, but clearance of any individual tooth may be adjusted to any desired amount by bending the tooth. The teeth of the combs are preferably made of spring steel since if a stone is encountered the teeth may return back into position when the stone has been passed.

I am aware of constructions having a comb disposed longitudinally of the cutter blades as distinguished from the inclined position in the present invention. The disadvantage of such a construction is that the teeth of the comb engage the weed stalk while the flat side of the comb is being carried toward the stalk. In the present device the blow from the stalk or from a stone is more nearly in alinement with the plane of the body portion of the comb, and thus the teeth of the comb resist injury where such teeth would be bent out of operative position were the force of the blow on the side of the teeth instead of partly in the plane of the comb.

It will be observed that the shaft 2 is bent in U-shaped form. This is for the purpose of permitting tall weeds or grass to attain a position substantially at the outer edge of the revolving teeth instead of being bent away from the teeth in the cutters by the shaft 2. There are constructions in which the outer edges of the cutter blades extend beyond the central axis of the drive wheel, and in which a bar is used as a means of holding opposite sides of the machine together and as a bumper. In such constructions it will not be necessary to have a U-shaped shaft like the one shown at 2.

The inner curved edges of the teeth 8 may be sharpened and in such instance the combs would act to cut the weed stalks as well as to draw them downwardly across the stationary blade to be cut by the succeeding rotary cutter blades.

The construction above described also permits the close setting of the teeth when considered with respect to the axis of the shaft. In other words, if one views the device from the front, he views a greater number of teeth between the frame members holding the cutter blades than he would if the comb were parallel with the cutter blades. Therefore, there is very little liability of a weed stalk weaving between the teeth of the comb. On the other hand if a weed stalk gets in between the teeth then there is plenty of space for the cut stalk to slip out again as by centrifugal action, since the spaces between the teeth are relatively large as may be seen by the end view of the circle of combs in Fig. 1.

The combs can be easily placed in position and just as easily removed if for any reason it is desired to remove a comb.

I claim:—

1. In a grass and weed mower, a plurality of revoluble cutter blades and a plurality of combs disposed transversely between and having their opposite ends secured to adjacent blades for engaging weeds or the like, to drag the weeds into cutting engagement with said blades.

2. In a grass and weed mower, a plurality of revoluble cutter blades and a plurality of combs disposed transversely between and having their opposite ends secured to adjacent blades, the ends of the teeth of said combs being in substantial circular alinement with the edges of the said cutter blades for engaging weeds or the like, to drag the weeds into cutting engagement with said blades.

3. In a grass and weed mower, a plurality of revoluble cutter blades and a plurality of combs having flat portions that are disposed transversely between adjacent blades in angular relation with respect to a plane normal to the axis of revolution of the cutter blades for engaging weeds or the like, to drag the weeds into cutting engagement with said blades.

4. In a grass and weed mower, a plurality of revoluble cutter blades, a series of combs disposed transversely between and attached to adjacent cutter blades and inclined in angular relation with respect to a plane normal to the axis of revolution of the cutter blades, and a similar series of combs attached to and disposed between other adjacent cutter blades and inclined in an opposite direction from the first mentioned series of combs.

5. In a grass and weed mower, a plurality of revoluble spiral-shaped cutter blades, a series of spaced-apart combs having flanges, the ends of the flanges being secured to adjacent cutter blades and being inclined to a plane normal to the axis of revolution of the blades, and each comb having a body portion angularly disposed with respect to its flange.

6. In a grass and weed mower, a plurality of revoluble spiral-shaped cutter blades, a series of spaced-apart combs having flanges, the ends of the flanges being secured to adjacent cutter blades and being inclined to a plane normal to the axis of revolution of the blades and each comb having a body portion integral with the flange and being bent angularly with respect to the flange at an angle greater than ninety degrees.

7. As an article of manufacture, a weed engaging comb provided with a plurality of hook-like teeth on one edge, and having a longitudinal flange on the opposite edge, the body portion of the comb being bent angularly with respect to the flange and the outer ends of the teeth of the bent body portion being substantially on an arc of a circle.

8. In a grass and weed mower, a plurality of spaced apart revoluble cutter blades, a group of combs disposed transversely between each pair of adjacent cutter blades, the combs of alternate groups being inclined to a plane normal to the axis of revolution and the combs of intermediate groups adjacent being inclined in an opposite direction.

9. In a grass and weed mower, a plurality of spaced apart revoluble cutter blades, a group of combs disposed transversely between each pair of adjacent cutter blades, the combs of alternate groups being inclined to a plane normal to the axis of revolution and the combs of intermediate groups adjacent being inclined in an opposite direction, the ends of the teeth of all of said combs being in substantially circular alinement.

ARTHUR F. MACCONOCHIE.